July 1, 1969  A. OBERLE  3,453,032

HYDROSTATIC AXIAL BEARING

Filed Dec. 8, 1967

Inventor
Artur Oberle
By Pierce, Scheffler & Parker
Attorneys

United States Patent Office 3,453,032
Patented July 1, 1969

3,453,032
HYDROSTATIC AXIAL BEARING
Artur Oberle, Ennetbaden, Switzerland, assignor to Aktiengesellschaft Brown, Boveri & Cie, Baden, Switzerland, a joint-stock company
Filed Dec. 8, 1967, Ser. No. 689,051
Claims priority, application Switzerland, Dec. 23, 1966, 18,547/66
Int. Cl. F16c 7/04, 1/24, 19/12
U.S. Cl. 308—9    9 Claims

ABSTRACT OF THE DISCLOSURE

A hydrostatic axial bearing structure for the shaft of a high-speed turbine engine comprises a stationary cylinder located coaxially with the shaft adjacent each end of the shaft. Interposed between each end of the shaft and the corresponding cylinder is a piston which is received in the cylinder. The piston is free to rotate and is actuated in an axial direction by oil pressure which is built up within the cylinder. Each piston includes a bore from one side thereof to the other so that oil passing from the cylinder through the bore to the other side of the piston sets up a lubricating film in a small gap which separates the end face of the shaft from that side of the piston. The oil pressure in the two cylinders is varied simultaneously in opposite senses so as to increase the pressure in the cylinder at that end of the shaft which moves towards it and simultaneously decreases the pressure in the cylinder at the opposite end of the shaft. Oil pressure control is exercised by a control valve correlated to each cylinder, the control valves being in turn controlled by a slide member which senses the direction of axial displacement of the turbine shaft.

---

The present invention relates to a hydrostatic axial bearing for high-speed turbine engines wherein both ends of the rotor shaft are made in the form of oppositely acting pistons subjected to oil-pressure, the oil-pressure on both pistons being controlled in such a manner by a control slide, operatively linked to the rotor, of a control valve that should the shaft undergo longitudinal displacement the change in pressure on both pistons opposes this displacement.

In the case of known axial bearings of this type, the ends of the shaft made in the form of pistons engage in a fixed cylindrical recess, the space between the piston-shaped part of the end of the shaft and the base of the recess being connected to an oil pressure pipe of the control valve. Although this arrangement of the pistons on the ends of the shaft allows their diameter to be made independent of that of the shaft, and the piston-diameter may thus be kept small with a view to low heating and low oil-losses, the full relative speed of the rotating shaft with respect to the cylindrical recess is present in disadvantageous fashion between adjacent sealing surfaces. This circumstance causes considerable frictional losses and increased oil-consumption in the case of high-speed turbine engines, since the sealing gap cannot be reduced to the desired extent.

The principal object of the present invention is to avoid these disadvantages. According to the invention, the axial bearing is characterized in that in order to generate thrust forces acting on the ends of the shaft proportional to the oil-pressures, additional pistons separated from the ends of the shaft are each mounted in a cylinder co-axial with the shaft in such a manner as to be capable of rotary motion and axial displacement.

Figure 1:
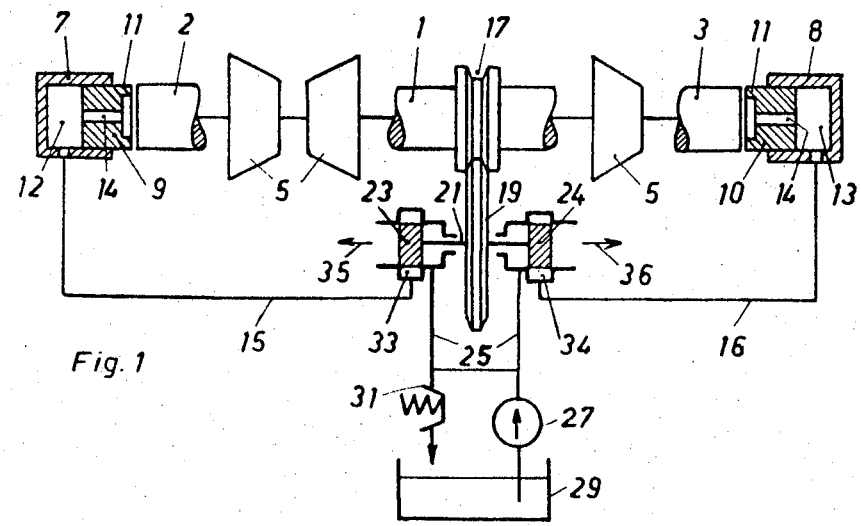
Figure 2:
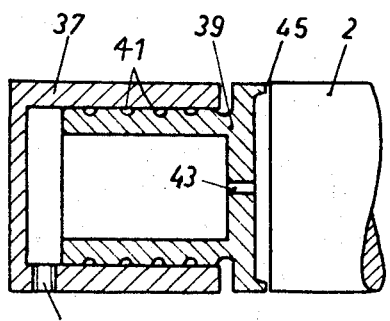
Figure 3:
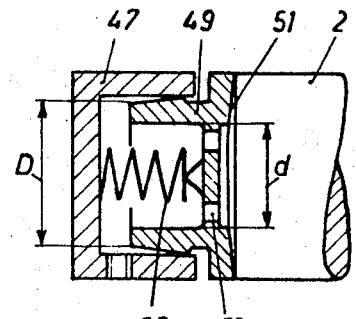
Figure 4:
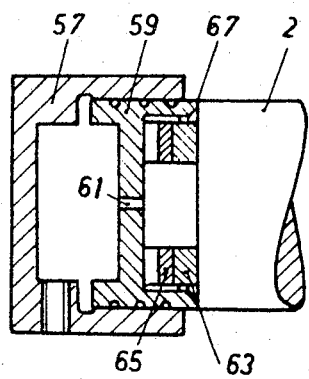

The invention is explained hereinafter by way of example with reference to the accompanying drawings, wherein:

FIG. 1 shows in a diagrammatic manner a turbine engine with a hydrostatic axial bearing according to the invention, FIGS. 2 and 3 show respectively two forms of embodiment of the improved axial bearing, illustrated in section at one of the two ends of the shaft, and FIG. 4 shows a further form of embodiment as a combination of a hydrostatic axial bearing with a hydrodynamic one.

According to FIG. 1, a high-speed turbine engine comprises a partly illustrated shaft 1 with ends 2 and 3. A plurality of turbines and/or turbo-compressors 5 are fitted to the shaft 1, whereof the radial bearings are not illustrated.

At each end 2 and 3 of the shaft, there is a cylinder 7, 8 respectively aligned co-axially with the shaft 1, each cylinder accommodating a piston 9, 10 respectively in such a manner as to be capable of rotary motion and axial displacement. The pistons 9, 10 comprise two effective surfaces, namely the surface directed towards the face of the end 2 or 3 of the shaft and the surface disposed inside the cylinder 7, 8. On the side aligned towards the end of the shaft, the piston 9, 10 is provided at its circumference with an edge 11 comprising a sealing surface which forms a thin gap with the face of the end 2, 3 of the shaft. On the side of the piston disposed in the cylinder 7, 8, the piston-surface forms, together with the base and wall of the cylinder, a pressure-space 12, 13 to which an oil-pressure pipe 15, 16 leads. The two sides of the piston are linked to one another by an aperture 14, for example a bore, so that oil under pressure introduced via the pipe 15, 16 passes from the pressure-space 12, 13 to the other side of the piston, emerges through the gap between the edge 11 and the face of the end of the shaft, and produces a lubricating film on the sealing surface of the gap.

At the point on the shaft 1 where the axial fixed point is intended to be located, the shaft 1 is provided with a groove 17 in which a ridged disc 19 is guided with a slight clearance. A double-acting rotary control valve 23, 24 is fitted to the rotatable and axially displaceable shaft part 21 of the ridged disc, and is supplied with oil under pressure from an oil-sump 29 by a pump 27 via pipes 25. A pressure-holding valve 31 is furthermore connected to the feed pipes 25.

Each slide-piece 23, 24 cooperates with a pressure-chamber 33, 34 respectively, and has two control edges, namely an inflow-control edge to the feed pipe 25 and an outflow-control edge to a return-flow pipe 35, 36 respectively, each diagrammatically illustrated by an arrow and leading to the oil-sump 29. The slides 23, 24 thus have four control edges altogether. The pressure-spaces 33 and 34 are linked via the pipes 15, 16 respectively to the corresponding pressure-spaces 12, 13, respectively of the cylinders 7, 8 respectively.

When the shaft 1 in the arrangement illustrated is displaced, for example to the left, the slide 23 which is moved via the ridged disc 19 will act by way of its inflow-control edge to increase the flow of oil into the pressure-space 33, and thus also into the pressure-space 12 of the cylinder 7. As a result, the hydrostatic pressure on the face of the end 2 of the shaft rises via the piston 9, and opposes displacement of the shaft. At the same time, the reverse procedure takes place at the other end of the shaft, the slide 24 acting by way of its outflow-control edge to allow oil to flow out of the pressure-space 34, and thus out of the pressure-space 13 of the cylinder 8, into the oil sump 29.

Because of the hydrodynamic friction which occurs in the lubricating film in the gap between the edge 11 of the pistons 7, 8 and the faces of the ends 2, 3 respectively of the shaft, the pistons 7 and 8 undergo torque from the ends 2 and 3 respectively of the shaft, so that they likewise rotate at reduced speed. The relative speed of the two sealing surfaces facing one another is accordingly less than in the known arrangement, in which the ends of the shaft or parts thereof act directly as pistons and are arranged in a cylinder. This has the advantageous effect of reducing frictional losses. In addition, suitable dimensions consequent upon the cooperation of a plurality of piston-surfaces enable a smaller sealing gap to be achieved, which also has the effect of reducing oil-consumption.

A few forms of embodiment of the additional piston 7 or 8 are described hereinafter by way of example with reference to FIGS. 2 and 4, these forms of embodiment acting after the manner of a follower piston and more particularly exhibiting advantageous emergency-running properties.

In the case of the form of embodiment illustrated in FIG. 2, a hollow piston 39 is arranged in a fixed cylinder 37 co-axial with the end 2 of the shaft. The piston 39 is supplied with oil under pressure on the left-hand side. For this purpose, the cylinder 37 is provided with a threaded hole 38 into which is screwed the oil-pressure pipe 15, illustrated in FIGURE 1, which proceeds from the slide 23. In order to lubricate the piston 39 which is capable of rotary motion and axial displacement in the cylinder 37, the piston is provided with grooves 41.

The piston-surface directed towards the face of end 2 of the shaft is larger than the effective surface of the side of the piston disposed in the cylinder 37. The larger piston-surface, and thus the face of the end 2 of the shaft, is linked to the smaller piston-surface by a bore 43 made in the form of a throttle orifice in the base of the piston 39. The right hand larger piston-surface is provided at its circumference with a valve-seat 45 which has an axial sealing effect against the end 2 of the shaft.

In the embodiment illustrated, the piston 39 acts as a follower piston with respect to the end 2 of the shaft, the pressure on the right-hand side of the piston setting itself in any particular case proportionally to the pressure on the left-hand side of the piston in accordance with the effective-surface-ratio of both sides of the piston, i.e. proportionally to the pressure in the oil-pressure pipe 15 in FIG. 1. In this connection, a substantially constant gap is set up at the valve-seat 45, which gap is independent of the pressure and is determined by the size of the throttle-bore 43. The oil emerging through the gap at the valve-seat 45 ensures a lubricating film on the seating surface. As a result of the hydrodynamic friction which occurs in this lubricating film, the rotating end 2 of the shaft exerts torque on the piston 39, so that the piston rotates at reduced speed. This in turn reduces the relative speed between the two mutually facing sealing surfaces of the valve-seat 45, and thus has the effect of reducing frictional losses.

In the form of embodiment illustrated in FIG. 3, a hollow piston 49 is likewise inserted into a fixed cylinder 47. However, the sealing surface of the outer edge of the piston with the face of the end 2 of the shaft is not made in the form of a narrow-circular valve-seat here, but rather in the form of a circular gap 51 which narrows outwards in the radial direction. In this connection, the inner limiting diameter $d$ of the sealing surface is smaller than the piston-diameter $D$ on the left-hand side of the piston to which the oil under pressure is fed.

Both sides of the piston are linked to one another by one or more axial bores 53 of such cross-section that there is at most an insubstantial pressure-difference between both sides. In order to prevent the piston 49 from lifting away from the end 2 of the shaft should the feed of oil under pressure fail for example, the hollow space in the piston 49, on the side on which oil is fed to the latter under pressure, contains a spring 55 which bears against the base of the cylinder 47 and pushes the piston 49 against the end 2 of the shaft.

In the case of the embodiment according to FIG. 3 also, the piston 49 follows the movement of the end 2 of the shaft under the action of the spring 55 and of the pressures which are set up. This results from the pressure-distribution over the conical gap 51 in dependence on the gap-width at the outlet, i.e. at the circumference of the piston. When the gap is very narrow at the outlet, the pressure-drop occurs substantially in an outer edge zone of the gap, while the pressure scarcely changes over the largest radially inward part of the gap. Considered in the radial direction inwards, the pressure thus rises approximately parabolically when there is a narrow gap at the outlet. On the contrary, the pressure-variation in the radial direction is nearly linear when there is a wide gap at the outlet. It follows from this that the mean pressure over the surface of the gap 51 drops as the gap-width increases, so that in this case the piston 49 is pushed in the direction of the end 2 of the shaft.

Because of the hydrodynamic friction which occurs in the lubricating film in the gap 51, the rotating end 2 of the shaft in turn exerts torque on the piston 49, so that the latter rotates at reduced speed. The advantage of the form of embodiment illustrated in FIG. 3 resides in that should the oil-supply fail the wide seating surface of the gap 51 has more favorable emergency-running properties than the narrower valve-seat 45 in FIG. 2.

A further improvement in the emergency-running properties of the hydrostatic axial bearing is achieved by the combination, illustrated in FIG. 4, of a hydrostatic axial bearing with a hydrodynamic one. In this form of embodiment, a conventional hydrodynamic axial bearing 63 is built into the piston 59 on the side thereof disposed towards the end 2 of the shaft, the said piston being arranged in a fixed cylinder 57 fed with oil under pressure. The axial bearing 63 bears by way of a resilient ring 65 against the base of the piston 59. The resilient ring 65 is so set that when this bearing is under its continuously permitted load, an edge of the piston 59 made in the form of a valve-seat 67 comes up against the face of the end 2 of the shaft for sealing purposes.

A bore 61 in the base of the piston 59 linking both sides thereof is made in the form of a throttle. As opposed to the arrangements hereinbefore described, the effective surfaces of both sides of the piston are at least substantially of the same size in the case of the form of embodiment illustrated in FIG. 4. Since oil flows away through the gap of the valve-seat 67, and must then flow via the throttle-bore 61, the pressure on the right-hand side of the piston 59 is lower than on its left-hand side. This gives rise to a hydrostatic force on the piston 59, which force is directed towards the end 2 of the shaft and is taken up by the additional hydrodynamic axial bearing 63. In the case of this form of embodiment also, the hydrodynamic friction causes the piston 59 to rotate at reduced speed with the end 2 of the shaft, with the result that the relative speed in the axial bearing is reduced in advantageous fashion. In addition, the hydrodynamic axial bearing 63 has to take up only part of the thrust of the shaft 1 (FIG. 1) or of the end 2 of the shaft, for example approximately one-third, while the remainder (for example two-thirds) is hydrostatically transmitted by the pressure on the right-hand side of the piston 59.

I claim:
1. In a hydrostatic axial bearing structure for the shaft of a high-speed turbine engine the combination comprising an axially stationary cylinder located coaxially with said turbine shaft adjacent each end thereof, a piston located in each said cylinder, said pistons being free to rotate and also free to shift in an axial direction, one side of each said piston in its respective cylinder being connected through a control valve correlated therewith to a source of pressurized oil such that the position of said control valve determines the fluid pressure on said side of said piston, and the opposite side of said piston being located in confronting relation to the corresponding end of said turbine shaft to establish a small gap therebetween en- abling flow of a lubricating film of said oil which passes to said gap from the interior of the cylinder through a bore in the piston, each said piston being rotated in its cylinder by the dynamic action of the lubricating film and a control slide for each control valve actuated by axial displacement of said turbine shaft to effect an increase in oil pressure in the cylinder at that end of the turbine shaft which moves toward the piston thereof and a simultaneous decrease in the oil pressure in the cylinder at the opposite end of the turbine shaft which moves away from the piston thereof.

2. A hydrostatic axial bearing structure for a turbine shaft as defined in claim 1 wherein said control slide is linked to and rotates with said turbine shaft by means of a ridged disc located at a fixed point on said shaft.

3. A hydrostatic axial bearing structure for a turbine shaft as defined in claim 1 wherein the opposite sides of each of said pistons differ in size, the side of the piston with the larger size being that side which confronts the end of the turbine shaft and including an axially sealing edge at the circumference thereof.

4. A hydrostatic axial bearing structure for a turbine shaft as defined in claim 3 wherein said sealing edge on each piston is constituted by a seating edge.

5. A hydrostatic axial bearing structure for a turbine shaft as defined in claim 3 wherein said sealing edge on each piston is constituted by the side of the piston which in cooperation with the end face of the turbine shaft establish a gap which narrows in a radially outward direction.

6. A hydrostatic axial bearing structure for a turbine shaft as defined in claim 5 and which further includes a compression spring seated in each cylinder and which bears at one end against the base of the cylinder and at the opposite end against said piston.

7. A hydrostatic axial bearing structure for a turbine shaft as defined in claim 1 wherein the surface portion of each said piston within its appertaining cylinder is provided with grooves to facilitate rotation thereof.

8. A hydrostatic axial bearing structure for a turbine shaft as defined in claim 1 wherein said bore in each piston through which pressurized oil flows is designed as a throttle.

9. A hydrostatic axial bearing structure for a turbine shaft as defined in claim 1 wherein the opposite sides of each piston have piston surfaces of substantially the same size, the side of the piston confronting the shaft end including an axially sealing seating edge at its circumference and being provided with a hydrodynamic axial bearing which bears by way of a resilient ring against the base of the piston.

References Cited

UNITED STATES PATENTS 2,050,887   8/1936   Howarth _____ 308—160

MARTIN P. SCHWADRON, *Primary Examiner.*

FRANK SUSKO, *Assistant Examiner.*

U.S. Cl. X.R.

308—172